(No Model.)
C. F. WHISLER.
NUT LOCK.
No. 373,544. Patented Nov. 22, 1887.
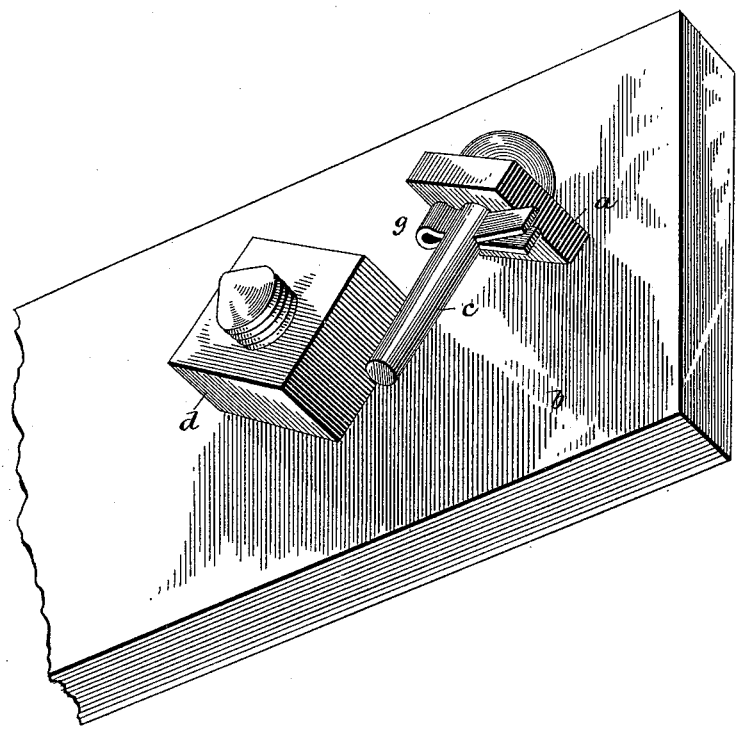
Witnesses
Edwin T. Yewell,
James J. Sheehy
Inventor,
Charles F. Whisler,

UNITED STATES PATENT OFFICE.

CHARLES F. WHISLER, OF ROCHESTER, PENNSYLVANIA.

NUT-LOCK.

SPECIFICATION forming part of Letters Patent No. 373,544, dated November 22, 1887.

Application filed February 20, 1886. Serial No. 192,729. (No model.)

*To all whom it may concern:*

Be it known that I, CHARLES F. WHISLER, a citizen of the United States, residing at Rochester, in the county of Beaver and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawing, which forms a part of this specification.

This invention relates to an improvement in devices for locking nuts, which improvement will be fully understood from the following description and claim, taken in connection with the annexed drawing, in which the figure is a perspective view, on an enlarged scale, of my improved nut-lock, showing the same applied to a nut.

Referring to the annexed drawing by letters, $b$ designates a metallic plate, which is perforated to receive through it a bolt, A, and cast or otherwise made with a lug, $a$, which is raised from its face in a plane diagonal to the upper and lower edges of this plate, as shown in the drawing. This lug is perforated, and through the perforation is passed a headed pin, $c$, after the nut $d$ has been screwed home on its bolt A and caused to assume the position relatively to the lug $a$ shown. The stem of the pin $c$ impinges against the flat edge of the nut and prevents this nut from turning on its bolt.

To effectually prevent the pin $c$ from casual displacement I insert through it, below the lug $a$ and in close relation thereto, a cotter-pin, $g$. It will thus be observed that I effectually lock the nut and also the locking-pin $c$. It will also be observed that by my improvement I am able to use the well-known square nut without indenting or changing the nut in any respect.

I am aware that it is not new to employ locking-pins for serrated or notched nuts, nor is it new to employ locking-pins with the common square nuts; but such pins have not, as I believe, been themselves provided with a positive locking device.

I claim—

The plate $b$, formed with an oblique perforated lug, the headed locking-pin $c$, passed through said lug from above downward against one edge of the nut, and the cotter-pin $g$, passed from above downward through the pin $c$ in close relation to the lug, all combined as described and shown.

CHARLES F. WHISLER.

Attest:
 H. T. MORRIS,
 M. E. HARRISON.